US012410658B1

(12) United States Patent
Flannery et al.

(10) Patent No.: US 12,410,658 B1
(45) Date of Patent: Sep. 9, 2025

(54) DOUBLE DOOR GATE APPARATUS

(71) Applicant: Regalo International, LLC, Longboat Key, FL (US)

(72) Inventors: Mark A. Flannery, Longboat Key, FL (US); Luke J. Duininck, Richfield, MN (US); Gary T. Schultze, Savage, MN (US)

(73) Assignee: Regalo International, LLC, Longboat Key, FL (US)

( * ) Notice: Subject to any disclaimer, the term of this patent is extended or adjusted under 35 U.S.C. 154(b) by 0 days.

(21) Appl. No.: 18/205,531

(22) Filed: Jun. 3, 2023

Related U.S. Application Data

(63) Continuation of application No. 17/346,239, filed on Jun. 12, 2021, now Pat. No. 11,668,134, which is a continuation of application No. 15/871,042, filed on Jan. 14, 2018, now Pat. No. 11,035,173.

(60) Provisional application No. 62/446,782, filed on Jan. 16, 2017.

(51) Int. Cl.
*E06B 11/02* (2006.01)
*E06B 9/04* (2006.01)
*E06B 9/00* (2006.01)

(52) U.S. Cl.
CPC ................ *E06B 11/02* (2013.01); *E06B 9/04* (2013.01); *E06B 11/022* (2013.01); *E06B 2009/002* (2013.01)

(58) Field of Classification Search
CPC .......... E06B 11/022; E06B 11/02; E06B 9/04; E06B 2009/002; E04H 17/1439
USPC ................................................ 49/50, 55, 57
See application file for complete search history.

(56) References Cited

U.S. PATENT DOCUMENTS

| | | | | |
|---|---|---|---|---|
| 852,485 | A | 5/1907 | Wroblewski | |
| 1,062,971 | A | 5/1913 | Hausmann | |
| 1,451,172 | A | 4/1923 | Mayer | |
| 1,621,828 | A | 3/1927 | Canny | |
| 1,787,249 | A | 12/1930 | Heinz | |
| RE19,617 | E | 6/1935 | Dresser | |
| 2,149,607 | A | 3/1939 | Keiser | |
| 3,180,667 | A | 4/1965 | Auboin et al. | |
| 3,233,932 | A | 2/1966 | Uttterback | |
| 3,684,336 | A | 8/1972 | Mathys | |
| 3,918,203 | A | 11/1975 | Ellison, Jr. | |
| 4,573,285 | A * | 3/1986 | Jokel | E06B 9/02 49/55 |
| 6,056,038 | A | 5/2000 | Foster | |
| 6,427,396 | B1 | 8/2002 | Harrison | |
| 7,887,029 | B2 * | 2/2011 | Flannery | E06B 9/06 256/65.16 |

(Continued)

FOREIGN PATENT DOCUMENTS

| | | | |
|---|---|---|---|
| CA | 2292034 | | 6/2001 |
| CN | 206007936 U | * | 3/2017 |

(Continued)

*Primary Examiner* — Justin B Rephann

(57) ABSTRACT

The present double door gate apparatus has a first lowermost frame member with a first inner end and a second lowermost frame member with a second inner end. The first and second inner ends are spaced apart and engaged by a first connector that engages exterior portions of the inner ends and a second connector that engages interior portions of the inner ends. First and second gates have inner ends that confront each other more closely than the inner ends of the lowermost frame members confront each other.

5 Claims, 9 Drawing Sheets

(56) References Cited

U.S. PATENT DOCUMENTS

| | | | | |
|---|---|---|---|---|
| 7,950,184 | B2 | 5/2011 | Flannery | |
| 7,975,431 | B2 | 7/2011 | Flannery | |
| 8,196,348 | B2 | 6/2012 | Flannery | |
| 8,448,381 | B2 | 5/2013 | Flannery | |
| 8,720,958 | B2 | 5/2014 | Flannery | |
| 9,127,496 | B1 * | 9/2015 | Flannery | E06B 9/06 |
| 9,382,750 | B1 * | 7/2016 | Flannery | E06B 9/04 |
| 9,689,197 | B1 * | 6/2017 | Flannery | E05B 17/2069 |
| 9,874,055 | B1 * | 1/2018 | Flannery | E06B 9/04 |
| 9,879,453 | B1 * | 1/2018 | Flannery | E06B 11/022 |
| 10,107,030 | B2 * | 10/2018 | Raffi | E06B 9/04 |
| 10,450,795 | B2 * | 10/2019 | Raffi | E05B 65/0007 |
| 10,533,370 | B1 * | 1/2020 | Flannery | E06B 3/26 |
| 10,619,807 | B1 * | 4/2020 | Flannery | F21V 17/16 |
| 10,683,699 | B2 | 6/2020 | Wang | |
| 10,774,587 | B2 * | 9/2020 | Flannery | E06B 9/04 |
| 10,907,404 | B1 * | 2/2021 | Flannery | E06B 3/509 |
| 10,934,768 | B2 * | 3/2021 | Flannery | E06B 11/04 |
| 10,934,769 | B2 * | 3/2021 | Flannery | E06B 9/04 |
| 11,035,173 | B1 * | 6/2021 | Flannery | E06B 11/022 |
| 11,162,300 | B1 | 11/2021 | Flannery | |
| 11,377,886 | B1 * | 7/2022 | Flannery | E05B 1/003 |
| 11,466,512 | B2 * | 10/2022 | Morris | E05B 1/0046 |
| 11,530,572 | B2 * | 12/2022 | Flannery | E06B 9/06 |
| 11,668,134 | B1 * | 6/2023 | Flannery | E06B 11/022<br>256/73 |
| 11,686,150 | B1 * | 6/2023 | Flannery | E05B 65/0007<br>49/258 |
| 11,739,589 | B1 * | 8/2023 | Kaiser | E06B 9/04<br>49/394 |
| 11,781,376 | B1 * | 10/2023 | Flannery | E06B 3/52<br>49/394 |
| 2007/0074453 | A1 | 4/2007 | Flannery | |
| 2008/0265233 | A1 | 10/2008 | Flannery | |
| 2009/0293363 | A1 * | 12/2009 | Flannery | E06B 7/32<br>49/55 |
| 2011/0225890 | A1 | 9/2011 | Greenwood | |
| 2013/0160365 | A1 | 6/2013 | Flannery | |
| 2013/0221305 | A1 | 8/2013 | Dilworth | |
| 2014/0007506 | A1 * | 1/2014 | Huang | E06B 3/32<br>49/394 |
| 2014/0373448 | A1 | 12/2014 | Henderson | |
| 2015/0089873 | A1 * | 4/2015 | Marsden | E06B 9/04<br>49/56 |
| 2015/0101250 | A1 | 4/2015 | Marsden | |
| 2015/0101253 | A1 * | 4/2015 | Marsden | E05C 19/003<br>49/386 |
| 2017/0211314 | A1 | 7/2017 | Raffi | |
| 2017/0350165 | A1 * | 12/2017 | Schort | E05B 65/0007 |
| 2019/0078353 | A1 * | 3/2019 | Gentil | E05C 1/12 |
| 2019/0136619 | A1 * | 5/2019 | Flannery | E05C 3/045 |
| 2019/0360263 | A1 * | 11/2019 | Wang | E06B 9/0623 |
| 2023/0203878 | A1 * | 6/2023 | Wang | E06B 9/02<br>160/84.06 |

FOREIGN PATENT DOCUMENTS

| | | | | |
|---|---|---|---|---|
| CN | 107859471 A | * | 3/2018 | E05F 15/605 |
| GB | 2144470 | | 3/1985 | |

* cited by examiner

DOUBLE DOOR GATE APPARATUS

This application is a continuation of U.S. patent application Ser. No. 17/346,239 filed Jan. 12, 2021 (U.S. Pat. No. 11,668,134 issued Jun. 6, 2023) and claims the benefit thereof under 35 U.S.C. § 120, which application is a continuation of U.S. patent application Ser. No. 15/871,042 filed Jan. 14, 2018 (U.S. Pat. No. 11,035,173 issued Jun. 15, 2021) and claims the benefit thereof under 35 U.S.C. § 120, which application claims the benefit under 35 U.S.C. 119 (e) of U.S. Provisional Patent Application No. 62/446,782 filed Jan. 16, 2017, which nonprovisional and provisional applications are hereby incorporated by reference in their entireties into this application.

FIELD OF THE INVENTION

The present invention relates generally to a double door gate apparatus, more particularly to a double door gate apparatus where each gate has a lowermost frame member with an inner end, and specifically to one or more connectors for engaging each of the inner ends.

BACKGROUND OF THE INVENTION

A product may be manufactured and packaged in an unassembled form at one location where it is stored until shipment. Then the packaged product may be shipped by one or more means of transportation, such as by air, sea, and/or land. The packaged product may make one or more layovers, such as in a port awaiting inspection, at a distribution center, or in a retail store, until the packaged product reaches its final destination, such as a residence or workplace. Regardless of where the packaged product is at any one point in time, space is usually at a premium.

The product may then be assembled by the end user. In the assembled form, the product more often than not takes up a greater amount of space. In the assembled form, it is likely desired that the product have certain characteristics such as strength, stability and safety.

SUMMARY OF THE INVENTION

A feature of the present invention is the provision in a double door gate apparatus, of a first frame, where the first frame includes a first end frame member that extends vertically and a first lowermost frame member that extends horizontally, where the first lowermost frame member includes a first inner end, and where the first inner end includes a top face, front face, and rear face.

Another feature of the present invention is the provision in a double door gate apparatus, of a first gate engaged to the first frame.

Another feature of the present invention is the provision in a double door gate apparatus, of a second frame, where the second frame includes a second end frame member that extends vertically and a second lowermost frame member that extends horizontally, where the second lowermost frame member includes a second inner end, and where the second inner end includes a top face, front face and rear face.

Another feature of the present invention is the provision in a double door gate apparatus, of a second gate engaged to the second frame.

Another feature of the present invention is the provision in a double door gate apparatus, of a first connector engaging the first inner end of the first lowermost frame member to the second inner end of the second lowermost frame member, and where the first connector engages exterior portions of the first and second inner ends.

Another feature of the present invention is the provision in a double door gate apparatus, of a second connector engaging the first inner end of the first lowermost frame member to the second inner end of the second lowermost frame member, where the second connector engages interior portions of the first and second inner ends.

Another feature of the present invention is the provision in a double door gate apparatus, of the first connector including an elongate rigid brace, where the elongate rigid brace is integral and one-piece, where the elongate rigid brace includes a first U-shaped section that engages the top, front and rear faces of the first inner end, where the elongate rigid brace includes a second U-shaped section that engages the top, front and rear faces of the second inner end, and where the first and second frames are nonpivotable relative to each other when the elongate rigid brace is engaged to the first and second inner ends.

Another feature of the present invention is the provision in a double door gate apparatus, of the first inner end being tubular and including a first opening, where the second inner end is tubular and includes a second opening, where the second connector includes an elongate insert having first and second insert ends, where the first insert end is engagable with the first opening, and where the second insert end is engagable with the second opening.

Another feature of the present invention is the provision in a double door gate apparatus, of the elongate insert being rigid such that, when the elongate rigid insert is engaged in the first and second openings, the first and second frames are nonpivotable relative to each other.

Another feature of the present invention is the provision in a double door gate apparatus, of the elongate insert including a pivot mechanism between the first and second insert ends such that, when the elongate insert is engaged in the first and second openings, the first frame is pivotable relative to the second frame.

Another feature of the present invention is the provision in a double door gate apparatus, of the first connector and the second connector being independent of each other and spaced apart from each other.

Another feature of the present invention is the provision in a double door gate apparatus, of the first connector including an upper plate portion, the upper plate portion including a raised oblong section.

Another feature of the present invention is the provision in a double door gate apparatus, of the first connector including an upper plate portion, a front plate portion, and a rear plate portion, where the upper plate portion, front plate portion, and rear plate portion are integral and one-piece and form a U-shape.

Another feature of the present invention is the provision in a double door gate apparatus, of the upper plate portion including a raised oblong section, where the raised oblong section is spaced from the front plate portion and the rear plate portion.

Another feature of the present invention is the provision in a double door gate apparatus, of the raised oblong section including a length having a first distance, where the first inner end of the first lowermost frame member is spaced from the first inner end of the second lowermost frame member by a second distance when the first connector is engaged to the inner ends, and where the first distance is greater than the second distance.

Another feature of the present invention is the provision in a double door gate apparatus, of the first connector having a length with a first distance, where the first gate includes a first gate frame having a first inner end, where the second gate includes a second gate frame having a second inner end, where the first gate frame is spaced apart from the second gate frame by a second distance when the first and second gates are closed, and where the first distance is greater than the second distance.

Another feature of the present invention is the provision in a double door gate apparatus, of the first inner end of the first lowermost frame member being spaced from the first inner end of the second lowermost frame member by a first distance when the first connector is engaged to the inner ends, where the first gate includes a first gate frame having a first inner end, where the second gate includes a second gate frame having a second inner end, where the first gate frame is spaced apart from the second gate frame by a second distance when the first and second gates are closed, and where the first distance is greater than the second distance.

Another feature of the present invention is the provision in a double door gate apparatus, of a first outer end portion of the first connector being pinned to the first lowermost frame member, and of a second outer end portion of the first connector being pinned to the second lowermost frame member.

Another feature of the present invention is the provision in a double door gate apparatus, of a connector engaging the first inner end of the first lowermost frame member to the second inner end of the second lowermost frame member, where the connector engages exterior portions of the first and second inner ends, of the first inner end of the first lowermost frame member being spaced from the second inner end of the second lowermost frame member by a first distance when the connector is engaged to the inner ends, of the first gate including a first gate frame having a first inner end, where the second gate includes a second gate frame having a second inner end, where the first inner end of the first gate frame is spaced apart from the second inner end of the second gate frame by a second distance when the first and second gates are closed, and of the first distance being greater than the second distance.

Another feature of the present invention is the provision in a double door gate apparatus, of a connector engaging the first inner end of the first lowermost frame member to the second inner end of the second lowermost frame member, where the connector engages interior portions of the first and second inner ends, of the first inner end of the first lowermost frame member being spaced from the second inner end of the second lowermost frame member by a first distance when the connector is engaged to the inner ends of the lowermost horizontal frame members, of the first gate including a first gate frame having a first inner end, where the second gate includes a second gate frame having a second inner end, where the first inner end of the first gate frame is spaced apart from the second inner end of the second gate frame by a second distance when the first and second gates are closed, and of the first distance being greater than the second distance.

Another feature of the present invention is the provision in a double door gate apparatus, of the first inner end of the first lowermost frame member being engaged to the second inner end of the second lowermost frame member such as by a direct engagement or indirect engagement, where the first gate includes a first gate frame having inner and outer end frame members and top and bottom frame members, where the outer end frame member defines a pivot axis on which the first gate swings, where the outer end frame member of the first gate frame includes an upper end portion and wherein the top frame member of the first gate frame includes an outer end portion, where a junction engages the upper end portion of the outer end frame member of the first gate frame to the outer end portion of the top frame member of the first gate frame, where the junction receives the upper end portion therein and wherein the junction receives the outer end portion therein, and where the junction extends obliquely from the outer end frame member of the first gate frame to the top frame member of the first gate frame to permit the first gate to be lifted axially on the pivot axis.

Another feature of the present invention is the provision in a double door gate apparatus, of a piece on the first base frame having a first and second stop, where the first stop abuts a first portion of the junction when the first gate is raised, and where the second stop abuts a second portion of the junction when the first gate is at a rest position so as to prevent the first gate from being raised.

Another feature of the present invention is the provision in a double door gate apparatus, of the second stop being pivotable to an out-of-the-way position to permit the first gate to be raised.

Another feature of the present invention is the provision in a double door gate apparatus, of the outer end frame member of the first gate frame having a shorter length than the inner end frame member of the first gate frame, and of the top frame member having a shorter length than the bottom frame member.

An advantage of the present invention is that the size of an unassembled double door gate apparatus can be shipped in a carton of minimal size.

Another advantage of the present invention is that the assembled double door gate apparatus is safe and sturdy.

Another advantage of the present invention is that unassembled double door gate apparatus can be quickly assembled.

DESCRIPTION

Figure 1:
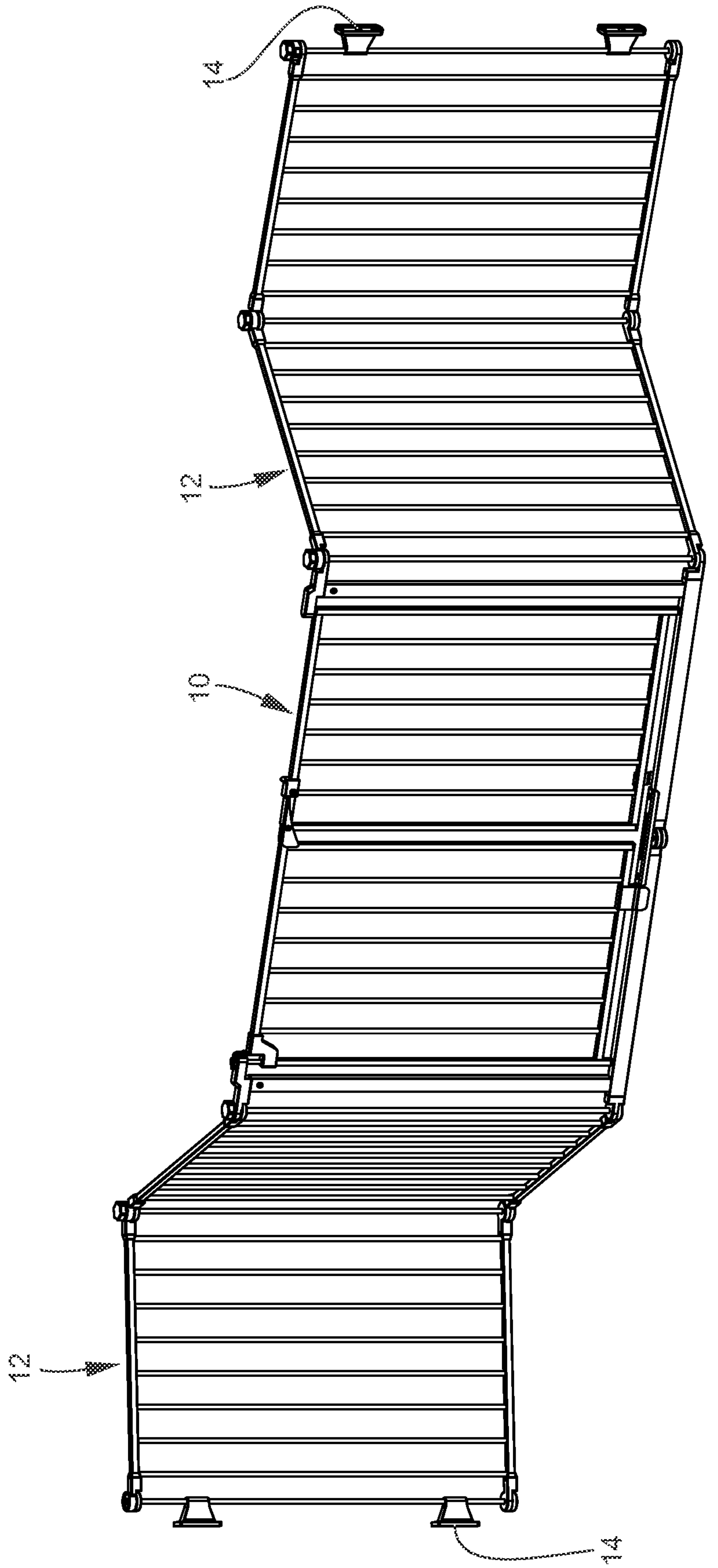
FIG. 1 is a perspective view of the double door gate apparatus of the present invention being connected in fencing.

As shown in FIG. 1, the present double door gate apparatus is indicated by the reference numeral 10. As to the double door gate apparatus 10, the following U.S. patents are hereby incorporated by reference in their entireties: 1) the Flannery et al. U.S. Pat. No. 9,382,740 dated Jul. 5, 2016 and entitled Double Door Gate Apparatus, and 2) the Flannery et al. U.S. Pat. No. 9,382,750 dated Jul. 5, 2016 and entitled Double Door Gate Apparatus.

The double door gate apparatus 10 is engaged in fencing 12. As to fencing 12, the Flannery U.S. Pat. No. 7,887,029 dated Feb. 15, 2011 and entitled In-House Gated Safety Barrier Having Customizable Layout is hereby incorporated by reference in its entirety.

The outer ends of the fencing 12 may be mounted to a vertical surface with brackets 14. Such vertical surface may be other fencing, an outside wall such as a brick or cement block wall, the exterior of a house, or a vertical surface in a house or other structure.

The outer ends of the double door gate apparatus 10 may be mounted to a vertical surface directly or with brackets such as brackets 14. Such vertical surface may be other fencing, an outside wall such as a brick or cement block wall, the exterior of a house, or a vertical surface in a house or other structure.

Figure 2:
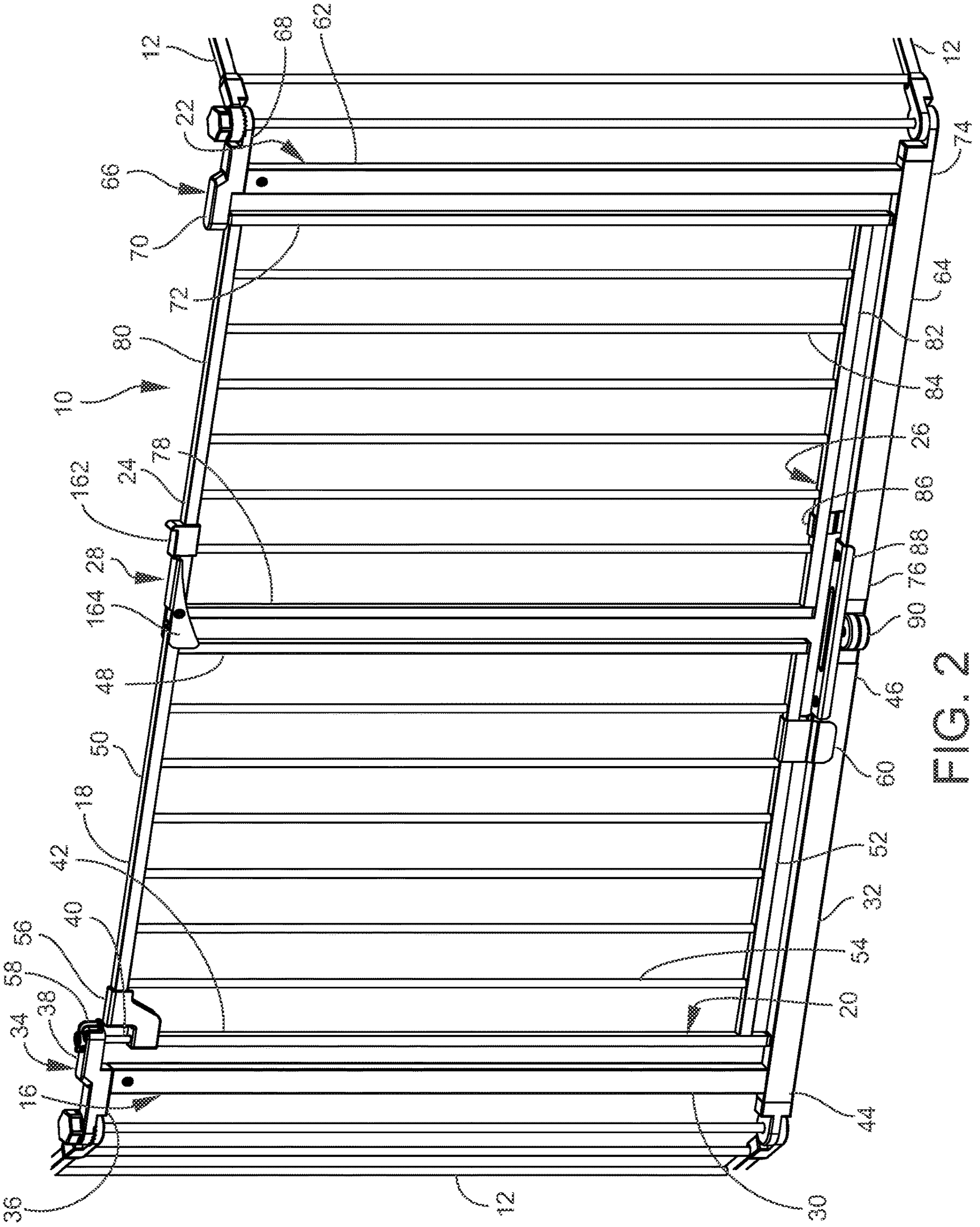
FIG. 2 is a perspective view of the double door gate apparatus of FIG. 1.

The double door gate apparatus 10 is shown in greater detail in FIG. 2. Double door gate apparatus 10 includes a first base frame 16, a first gate 18, a first gate frame 20, a second base frame 22, a second gate 24, and a second gate frame 26.

The first and second gates 18, 24 are engaged to each other by a top latch apparatus 28.

First base frame 16 is generally L-shaped. First base frame 16 includes a vertical support member or standard 30 rigidly fixed, such as by welding, to a lowermost horizontal frame member 32. Vertical and horizontal frame members 30, 32 are formed of a metal such as steel or aluminum, are tubular, and are rectangular or square in section from end to end. Vertical and horizontal frame members 30, 32 define a plane.

An upper piece 34 is engaged to the upper end of vertical frame member 30. Upper piece 34 includes a lower and outer portion 36 that extends outwardly to engage fencing 12. Upper piece 34 includes an upper and inner portion 38 that extends inwardly to serve as a mount for a vertical post 40 that in turn engages first gate 18.

Vertical post 40 may extend from upper and inner portion 38, downwardly through a tubular outer end frame member 42 of the first gate frame 20, and to lowermost horizontal frame member 32 to which the vertical post 40 is engaged. Vertical post 40 serves as a pivot upon which first gate 18 swings. If desired, vertical post 40 may be replaced by an upper post portion and a lower post portion, where the upper post portion engages the upper and inner portion 38 and an upper portion of the tubular outer end frame member 42, where the lower post portion engages the lowermost horizontal frame member 32 and a lower portion of the tubular outer end frame member 42, and where the upper post portion and lower post portion are separate pieces spaced apart from each other.

Lowermost horizontal frame member 32 includes an outer end 44 and an inner end 46. The junction between the vertical support member 30 and the lowermost horizontal frame member 32 is set inwardly from and spaced from the outer end 44. Vertical support member 30 is set on top of lowermost horizontal frame member 32. Outer end 44 is engaged to fencing 12. Lowermost horizontal frame member 32 includes a pair of side faces, a top face, and a bottom face. Such side faces oppose each other. Such top and bottom faces oppose each other.

First gate frame 20 includes tubular outer end frame member 42, inner end frame member 48, upper frame member 50 and lower frame member 52. Outer end frame member 42 is shorter in length than inner end frame member 48. Upper or top frame member 50 is shorter in length than lower or bottom frame member 52. Outer end frame member 42 and upper or top frame member 50 terminate in the oblique junction 56 and do not further proceed in a straight line to meet each other. First gate frame 20 further includes a set of six vertical frame members 54. Vertical frame members 42, 54 and 48 are spaced equidistantly from adjacent vertical frame members 42, 54, and 48. Vertical frame members 42, 54 and 48 run parallel to each other. Vertical frame members 54 run to and between the bottom face of upper frame member 50 and the top face of lower frame member 52. Tubular outer end frame member 42 extends a distance that is shorter than a straight distance from the lower end of upper and inner portion 38 and the top face of the lowermost horizontal frame member 32 such that tubular outer end frame member 42 is slideable vertically on post 40 when the first gate 18 is lifted and lowered. Inner end frame member 48 extends from the bottom face of upper frame member 50 to the inner end of lower frame member 52 where the bottom end of inner end frame member 48 is flush with the bottom face of lower frame member 52. Lower frame member 52 extends from inner end frame member 48 to a side face of tubular outer end frame member 42. Upper frame member 50 extends from a top of inner frame member 48, where an inner end of upper frame member 50 is flush with the inner face of inner end frame member 48, to a junction 56. If desired, upper frame member 50 may extend slightly inwardly of inner end frame member 48 to provide for more engagement with top latch apparatus 28.

First gate frame 20 further includes the junction 56. Junction 56 extends between the upper frame member 50 and the tubular outer end frame member 42. Junction 56 depends in a stepped manner from upper frame member 50 to tubular outer end frame member 42 to provide a space for the tubular inner end frame member 42 to be raised and lowered relative to upper piece 34 and lowermost horizontal frame member 32.

First base frame 16 includes pivoting stop 58. Pivoting stop 58 prevents the tubular inner frame member 42 and the first gate 18 from being raised when the pivoting stop 58 abuts the top face of junction 56. Pivoting stop 58 permits the tubular inner frame member 42 and the first gate 18 to be raised when the pivoting stop 58 is moved out of the way. Pivoting stop 58 is pivotably engaged to piece 34.

First gate 18 includes inverted U-shaped stop 60. U-shaped stop 60 is rigidly affixed to the lower frame member 52 toward the inner end of the first gate 18. U-shaped stop 60 is immediately adjacent to the vertical support member 54 which in turn is immediately adjacent to the inner end frame member 48. U-shaped stop 60 includes two sides. Each of the sides of the U-shaped stop 60 includes inner face portions that are rigidly affixed to the side faces of lower frame member 52 of the first gate frame 20. Each of the sides of the U-shaped stop 60 includes inner face portions that confront and abut but do not adhere to side faces of the lowermost horizontal frame member 32 of first base frame 16. Lowermost horizontal frame member 32 has a greater width than does lower frame member 52 such that each of the sides of U-shaped member 60 has a stepped structure. When first gate 18 is raised, the lower ends of the sides of the U-shaped stop 60 clear the top face of lowermost horizontal frame member 32 such that the first gate 18 may be swung to either side of the double door gate apparatus 10.

Second base frame 22 is generally L-shaped. Second base frame 22 includes a vertical support member or standard 62 rigidly fixed, such as by welding, to a lowermost horizontal frame member 64. Vertical and horizontal frame members 62, 64 are formed of a metal such as steel or aluminum, are tubular, and are rectangular or square in section from end to end. Vertical and horizontal frame members 62, 64 of second base frame 22 define a plane and lie coplanar with vertical and horizontal frame members 30, 32 of the first base frame 16.

An upper piece 66 is engaged to the upper end of vertical frame member 62. Upper piece 66 includes a lower and outer portion 68 that extends outwardly to engage fencing 12. Upper piece 66 includes an upper and inner portion 70 that extends inwardly to serve as a mount for a vertical post that in turn engages second gate 24.

Such a vertical post may extend from upper and inner portion 70, downwardly through a tubular outer end frame member 72 of the second gate frame 26, and to lowermost horizontal frame member 64 to which such vertical post is engaged. Such vertical post serves as a pivot upon which second gate 24 swings. If desired, such vertical post may be replaced by an upper post portion and a lower post portion, where the upper post portion engages the upper and inner portion 70 and an upper portion of the tubular outer end frame member 72, where the lower post portion engages the lowermost horizontal frame member 64 and a lower portion of the tubular outer end frame member 72, and where the upper post portion and lower post portion are separate pieces spaced apart from each other.

Lowermost horizontal frame member 64 includes an outer end 74 and an inner end 76. The junction between the vertical support member 62 and the lowermost horizontal frame member 64 is set inwardly from and spaced from the outer end 74. Vertical support member 62 is set on top of lowermost horizontal frame member 64. Outer end 74 is engaged to fencing 12. Lowermost horizontal frame member 64 includes a pair of side faces, a top face, and a bottom face. Such side faces oppose each other. Such top and bottom faces oppose each other.

Second gate frame 26 includes tubular outer end frame member 72, inner end frame member 78, upper frame member 80 and lower frame member 82. Second gate frame 26 further includes a set of six vertical frame members 84. Vertical frame members 72, 84 and 78 are spaced equidistantly from adjacent vertical frame members 72, 84, and 78. Vertical frame members 72, 84 and 78 run parallel to each other. Vertical frame members 84 run to and between the bottom face of upper frame member 80 and the top face of lower frame member 82. Tubular outer end frame member 72 extends a distance that is substantially the same or slightly less than a straight distance from the lower end of upper and inner portion 70 and the top face of the lowermost horizontal frame member 64 such that tubular outer end frame member 72 is pivotable vertically on the inner post running through member 72 when the second gate 24 is swung open and swung closed.

Inner end frame member 78 extends from the bottom face of upper frame member 80 to the inner end of lower frame member 82 where the bottom end of inner end frame member 78 is flush with the bottom face of lower frame member 82. Lower frame member 82 extends from inner end frame member 78 to a side face of tubular outer end frame member 72. Upper frame member 80 extends from a top of inner frame member 78, where an inner end of upper frame member 80 is flush with the inner face of inner end frame member 78, to the inner face of tubular outer end vertical support member 72. If desired, upper frame member 80 may extend slightly inwardly of inner end frame member 78 to provide for more engagement with top latch apparatus 28.

Second gate 24 includes downwardly extending stop 86. Stop 86 is rigidly affixed to the lower frame member 82 toward the inner end of the second gate 24. Stop 86 is immediately adjacent to the vertical support member 84 which in turn is immediately adjacent to the inner end frame member 78. Stop 86 includes a single side. While stop 86 is rigidly affixed to lower frame member 82, stop 86 is not affixed to but abuts lowermost horizontal support member 64. Stop 86 includes a lower end that is disposed at a lower elevation than the top face of lowermost horizontal support member 64 such that second gate 24 is swingable in only one direction and is not swingable completely over the lowermost horizontal support member 64 to the other side of the double door gate apparatus 10.

FIG. 2 further shows the first connector 88 and the second connector 90. The first connector 88 extends to and between exterior portions of the lowermost horizontal frame members 32, 64. The second connector 90 extends to and between interior portions of the lowermost horizontal frame members 32, 64.

Figure 3A:
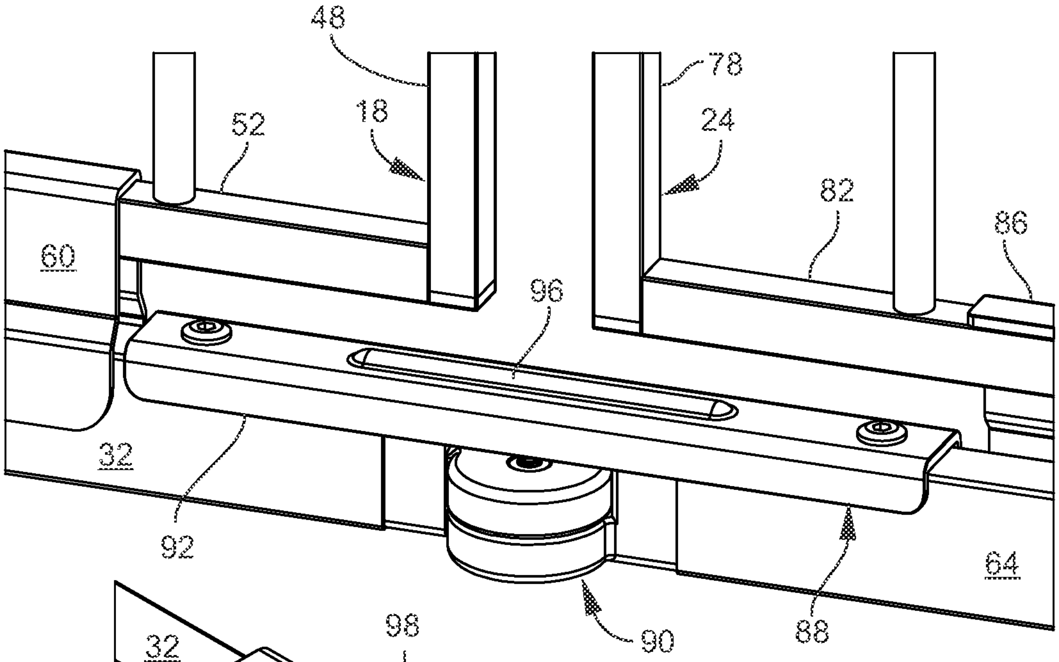
FIG. 3A is a perspective view of first and second connectors between the first and second gate frames of FIG. 2.
Figure 3B:
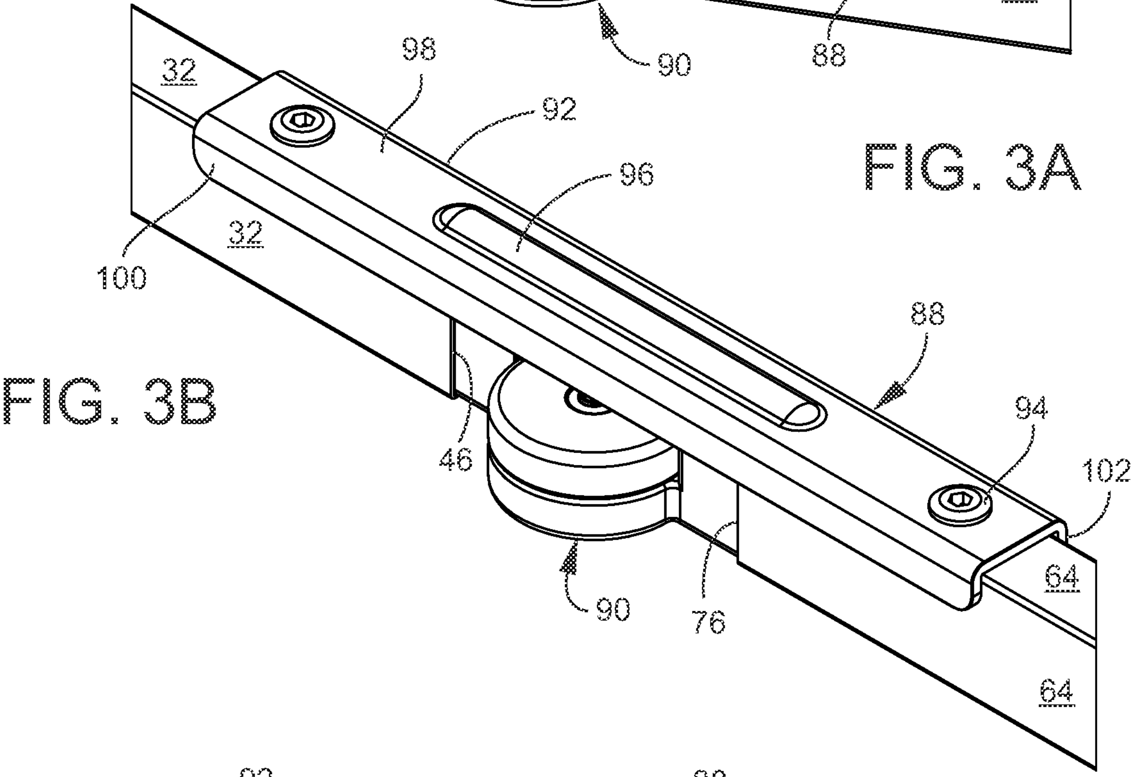
FIG. 3B is a perspective view of the first and second connectors of FIG. 3A.
Figure 3C:
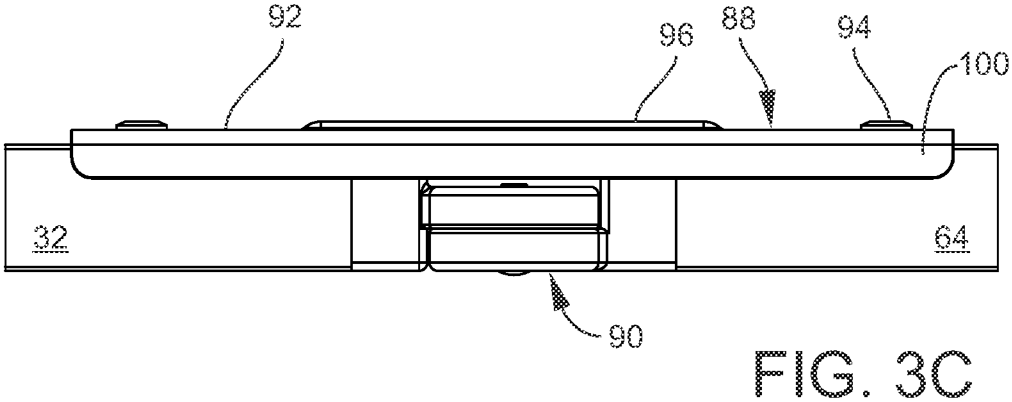
FIG. 3C is a side view of the first and second connectors of FIG. 3A.
Figures 4A, 4B, 4C, 4D, 4E, 4F:
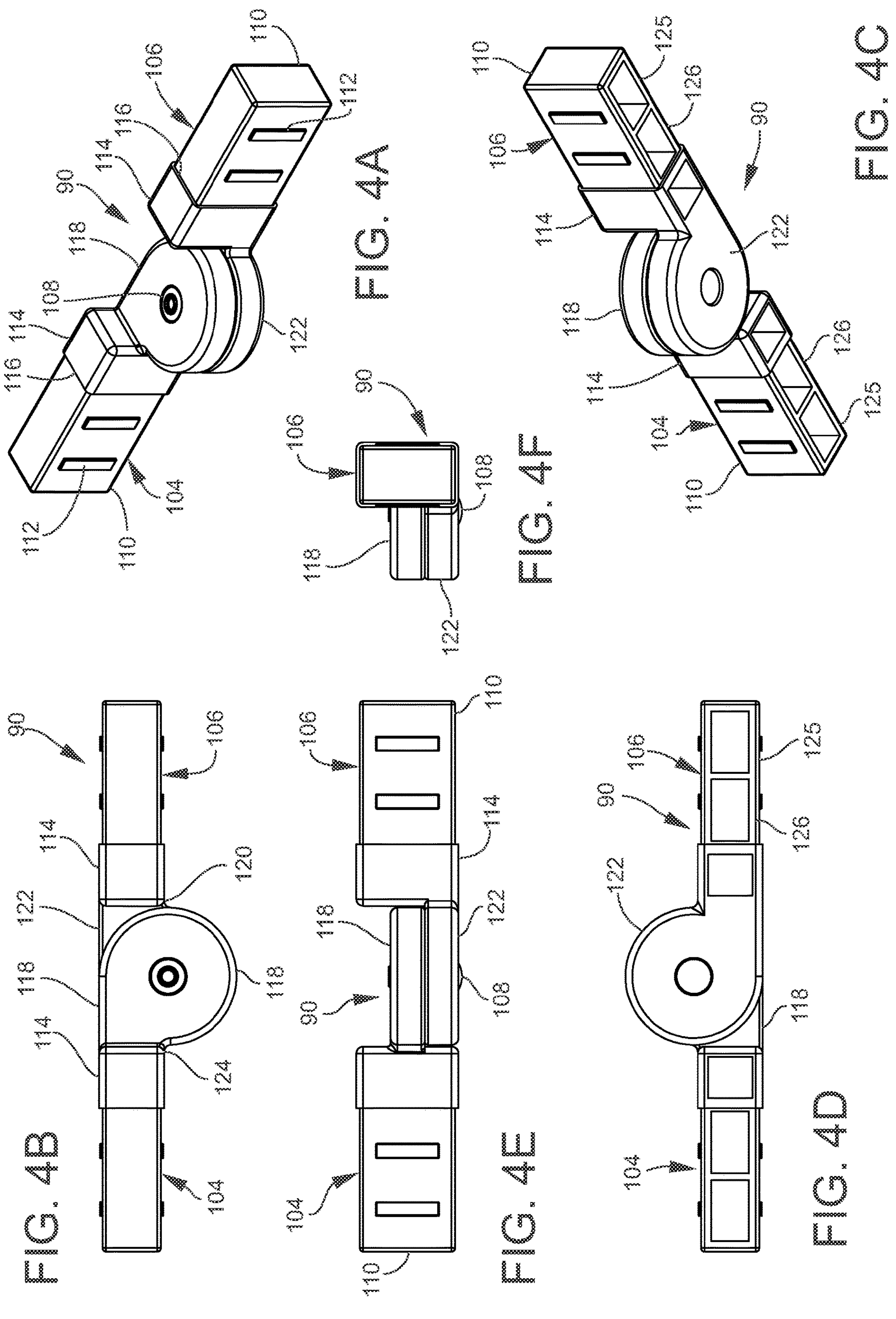
FIG. 4A is a top perspective isolated view of the second connector of FIG. 3A.
FIG. 4B is a top isolated view of the second connector of FIG. 4A.
FIG. 4C is bottom perspective isolated view of the second connector of FIG. 4A.
FIG. 4D is a bottom perspective isolated view of the second connector of FIG. 4A.
FIG. 4E is a side isolated view of the second connector of FIG. 4A.
FIG. 4F is an end isolated view of the second connector of FIG. 4A.

As shown in FIGS. 3A, 3B and 3C, first connector 88 includes an elongate rigid U-shaped brace 92. Brace 92 is U-shaped from end to end. Brace 92 is integral and one-piece. A first U-shaped section of brace 92 engages the top, front and rear faces of an inner end portion of the lowermost horizontal support member 32 of the first base frame 16. A second U-shaped section of brace 92 engages the top, front and rear faces of an inner end portion of the lowermost horizontal support member 64 of the second base frame 22. Outer end portions of the elongate rigid brace are pinned with pin connectors 94 to the inner end portions of the lowermost horizontal support members 32, 64. The first and second base frames 16, 22 are nonpivotable relative to each other when the rigid elongate brace 92 is pinned to the lowermost horizontal support members 32, 64. Elongate rigid brace 92 captures each of the lowermost horizontal support members 32, 64 on three side or three faces of the lowermost horizontal support members 32, 64 to minimize swing of the first and second base frames 16, 22 relative to each other. A drawing apart of the first and second base frames 16, 22 away from each other in a straight line is minimized by the pinning of the elongate base 92 to the lowermost horizontal support members 32, 64 by the pin connectors 94. Elongate rigid U-shaped brace 92 further includes a raised oblong section 96 that is formed in the top plate portion 98, that is spaced from the front plate portion 100, that is spaced from the rear plate portion 102, that is spaced from the pin connectors 94, and that is spaced from each of the ends of the rigid brace 92. Top plate portion 98, front plate portion 100, and rear plate portion 102 form the U-shape of the rigid brace 92. Rigid brace 92 may be referred to as a stiffener. Raised oblong section 96 provides for greater rigidity for top plate portion 98 and thus provides for greater rigidity for elongate brace 92 as a whole.

The raised oblong section 96 includes a length having a first distance. The first inner end 46 of the first lowermost frame member 32 is spaced from the second inner end 76 of the second lowermost frame member 64 by a second distance. When the first connector 88 is engaged to the inner ends 46, 76, the first distance is greater than the second distance. When packaged in an unassembled form, the outer end tubular support member 42 may be on top of or abutting the standard 30 of the first base frame 16 such that the inner end of gate 18 does not extend beyond the inner end 46 of the lowermost horizontal support member 32. However, when assemble, the first gate 18 is engaged at another location, namely at the distal end 135 of piece 34 such that the inner end of gate 18 or the inner end vertical support member 48 of gate 18 extends beyond the inner end 46 of lowermost horizontal support member 32.

The first connector 88 has a length of a first distance. The first gate 18 includes a first gate frame 20 having a first inner end. The second gate 24 includes a second gate frame 26 with a second inner end. The first gate frame 20 is spaced apart from the second gate frame 26 by a second distance when the first and second gates 18, 24 are closed. Here the first distance is greater than the second distance.

The first inner end 46 of the first lowermost frame member 32 is spaced from the second inner end 76 of the second lowermost frame member 64 by a first distance when the first connector 88 is engaged to the inner ends 46, 76. The first gate 18 includes a first gate frame 20 having a first inner end. The second gate 24 includes a second gate frame 26 having a second inner end. The first gate frame 20 is spaced apart from the second gate frame 26 by a second distance when the first and second gates 18, 24 are closed. Here the first distance is greater than the second distance.

Second connector 90 is shown in FIGS. 3A, 3B, 3C and is further shown in FIGS. 4A, 4B, 4C, 4D, 4E and 4F. Second connector 90 includes a first portion 104 and a second portion 106 engaged by a pivot pin 108. First portion 104 is integral and one-piece. Second portion 106 is integral and one-piece.

First portion 104 includes an insertable male section 110 that that is rectangular in section and that is inserted into the open female end 46 of lowermost horizontal support member 32. On each of its front and rear faces, insertable male section 110 includes a pair of vertically extending spaced apart nubs 112 or raised sections 112 that offer a friction fit with the associated inside faces of the interior of the female open end 46 of the lowermost horizontal support member 32. Except for the raised sections 112, insertable male section 110 has a width that is substantially equal to the distance between the inside front and rear faces of open female end 46 and its lowermost horizontal support member 32 and a height that is substantially equal to the distance between the inside bottom and top surfaces of the open female end 46 and its lowermost horizontal support member 32. The top and bottom faces of insertable male section 110 are smooth and flat and planar and have no raised sections. Insertable male section 110 is hidden from view when in lowermost horizontal support member 32.

First portion 104 includes a visible stop section 114. Visible stop section 114 is rectangular in section and includes a width and height greater than the respective width and height of insertable male section 110 of first portion 104. The width and height of visible stop section 114 is substantially the same as the width and height of the outside faces of the lowermost horizontal support member 32. When the insertable male section 110 of first portion 104 is inserted into the open female end 46, a rectangular stop edge 116 stops the insertion of the first portion 104 into the lowermost horizontal support member 32 by abutting up against the inner end 46 of the lowermost horizontal support member 32. When first portion 104 is engaged to the open female end 46 of lowermost horizontal frame support member 32, visible stop section 114 of first portion 104 is visible.

First portion 104 includes a disk like section 118 extending from the outer end of visible stop section 114 of first portion 104. Disk like section 118 extends from a horizontally extending mid-portion of the inner end face of visible stop section 114 of first portion 104. Disk like section 118 is spaced from the top and bottom of the visible stop section 114. Disk like section 118 includes a circular circumference that extends for about 270 degrees of a total circumference of the disk like section 118. About one-half of the disk like section 114 extends beyond the front face of the double door gate apparatus 10 where the front face of the double door gate apparatus 10 is defined by the front faces of the lowermost horizontal support members 32, 64, which front faces are co-planar. The remaining one-half of the disk like section 118 is disposed between the front and rear faces of the double door gate apparatus 10 where the front and rear faces of the double door gate apparatus 10 are defined by the front and rear faces of the lowermost horizontal support members 32, 64, where such front faces are coplanar and where such rear faces are coplanar. The portion of the disk like section 118 that extends beyond the front face of the double door gate apparatus 10 is circular for about 180 degrees. The inner edge of the disk like section 118 tangentially confronts a corner vertical edge 120 of a face of the inner end of second portion 106.

Second portion 106 includes the insertable male section 110 that that is rectangular in section and that is inserted into the open female end 76 of lowermost horizontal support member 64. On each of its front and rear faces, insertable male section 110 includes a pair of vertically extending spaced apart nubs 112 or raised sections 112 that offer a friction fit with the associated inside faces of the interior of the female open end 76 of the lowermost horizontal support member 64. Except for the raised sections 112, insertable male section 110 has a width that is substantially equal to the distance between the inside front and rear faces of open female end 76 and its lowermost horizontal support member 64 and a height that is substantially equal to the distance between the inside bottom and top surfaces of the open female end 76 and its lowermost horizontal support member 64. The top and bottom faces of insertable male section 110 are smooth and flat and planar and have no raised sections. Insertable male section 110 is hidden from view when in lowermost horizontal support member 64.

Second portion 106 includes the visible stop section 114. Visible stop section 114 is rectangular in section and includes a width and height greater than the respective width and height of insertable male section 110 of second portion 106. The width and height of visible stop section 114 of second portion 106 is substantially the same as the width and height of the outside faces of the lowermost horizontal support member 64. When the insertable male section 110 of second portion 106 is inserted into the open female end 76, the rectangular stop edge 116 stops the insertion of the second portion 106 into the lowermost horizontal support member 64 by abutting up against the inner end 76 of the lowermost horizontal support member 64. When second portion 106 is engaged to the open female end 76 of lowermost horizontal frame support member 64, visible stop section 114 of second portion 106 is visible.

Second portion 106 includes a disk like section 122 extending from the outer end of visible stop section 114 of second portion 106. Disk like section 122 extends from a horizontally extending lower portion of the inner end face of visible stop section 114 of second portion 106. A bottom face of disk like section 122 is coplanar with bottom faces of visible sections 114 of each of the first and second portions 104, 106. An upper face of disk like section 122 confronts and abuts and is adjacent to a lower face of disk like section 118. The circumferential portions of the disk like sections 118, 122 that extend beyond the front face of double door gate apparatus 10 for 180 degrees are coaxial with each other and are flush with each other. Each of the disk like portions 118, 122 are sandwiched between the inner ends of the visible sections 114 of first and second portions 104, 106.

Disk like section 122 is spaced from the top of the visible stop section 114 of second portion 106. Disk like section 122 includes a circular circumference that extends for about 270 degrees of a total circumference of the disk like section 122. About one-half of the disk like section 122 extends beyond the front face of the double door gate apparatus 10 where the front face of the double door gate apparatus 10 is defined by the front faces of the lowermost horizontal support members 32, 64, which front faces are co-planar. The remaining one-half of the disk like section 122 is disposed between the front and rear faces of the double door gate apparatus 10 where the front and rear faces of the double door gate apparatus 10 are defined by the front and rear faces of the lowermost horizontal support members 32, 64, where such front faces are coplanar and where such rear faces are coplanar. The portion of the disk like section 122 that extends beyond the front face of the double door gate apparatus 10 is circular for about 180 degrees. The inner edge of the disk like section 122 tangentially confronts a corner vertical edge 124 of a face of the inner end of first portion 102.

Pivot pin 108 includes an axis that is in the plane defined by the front face of double door gate apparatus 10, which front face is defined by the front faces of lowermost horizontal support members 32, 64. With the pivot pin 108 disposed as such, the front faces of each of the first and second base frames 16, 22 can swing toward each other so as to confront and abut up against each other, where the front faces of each of the first and second base frames 16, 22 are defined by respective front faces of lowermost horizontal support members 32, 64. When the first and second base frames 16, 22 confront each other, such a position may be referred to as a storage configuration or a folded configuration and the double door gate apparatus 10 may be shipped in such a folded configuration with the first and second gates 18, 24 engaged to their respective first and second base frames 16, 22. Prior to set up, the first and second base frames 16, 22 are unfolded and placed into a coplanar position with each other. Then the first connector 88 is affixed to the inner end portions of the lowermost horizontal support members 32, 64 such that the first and second base frames 16, 22 are rigidly and nonpivotably engaged to each other. As a whole, first portion 104, second portion 106, and pivot pin 108 can be referred to as a pivot junction or pivot knuckle.

Each of the insertable male sections 110 of the first and second portions 104, 106 are made up of two boxes 125, 126 that share an inner wall or an end side. Each of the boxes 125, 126 includes five sides and an open bottom, where the five sides include a front side, a back side, a top side and two end sides and where the top side is opposite of the open bottom.

The visible section 114 is made up of a single box having five sides and an open bottom, where the five sides include a front side, a back side, a top side and two end sides and where the top side is opposite of the open bottom. Visible section 114 shares an end wall with box 126 of insertable male section 110, with the end wall of the visible section 114 having a greater width and height than the end wall of box 126.

Figure 5:
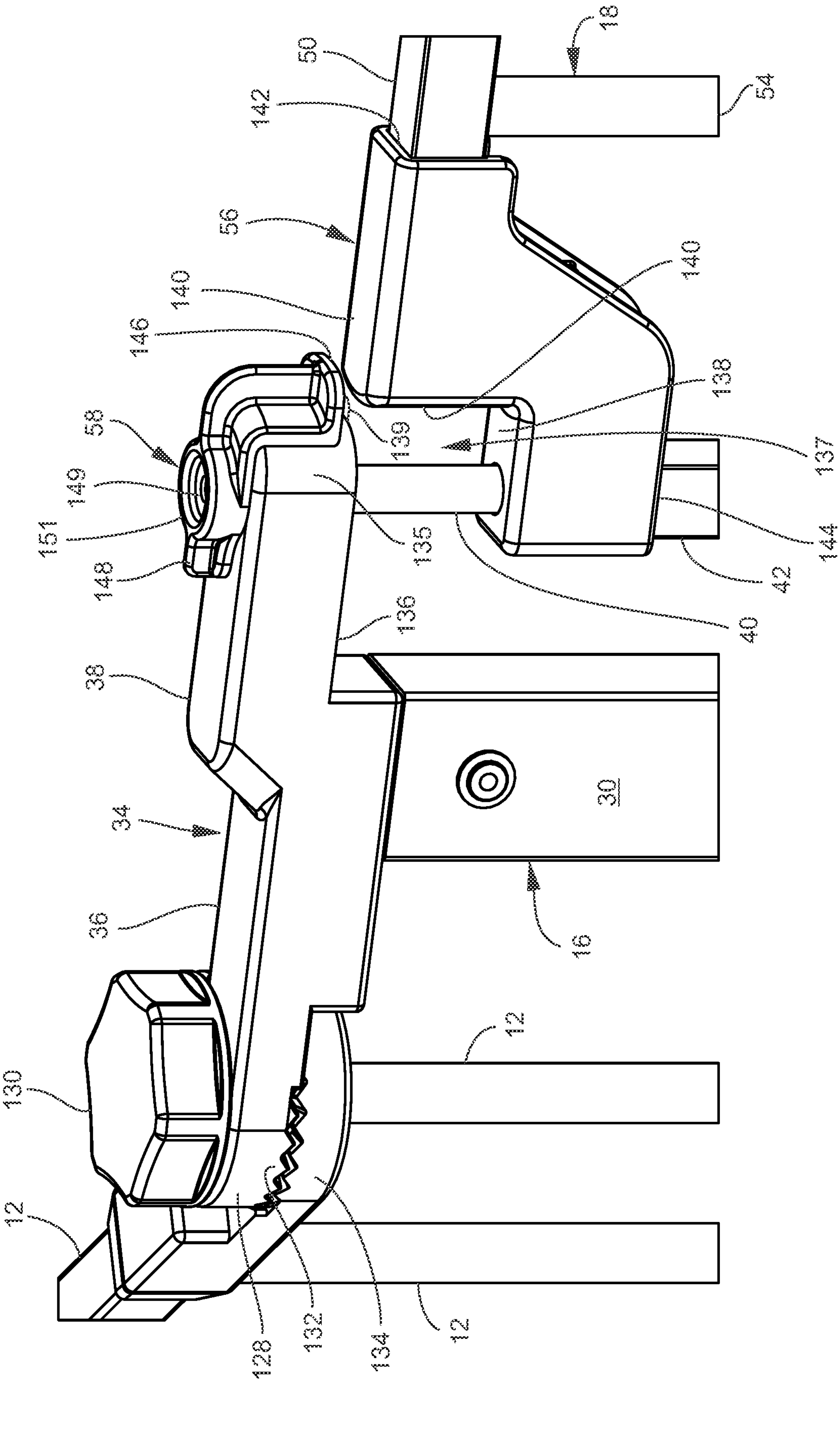
FIG. 5 is a perspective view of the lift inhibitor or pivoting stop of the double door gate apparatus of FIG. 2.
Figure 6A:
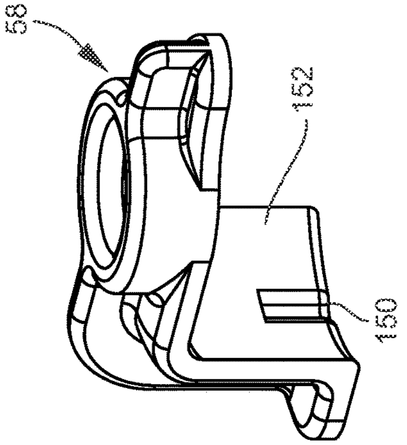
FIG. 6A is a top perspective isolated view of the lift inhibitor of FIG. 5.
Figure 6C:
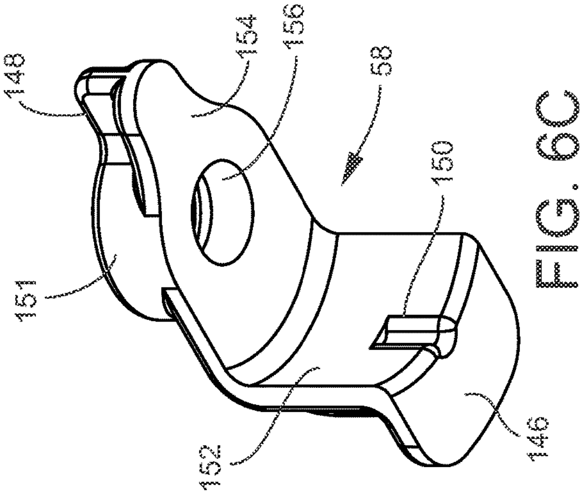
FIG. 6C is a bottom perspective isolated view of the lift inhibitor of FIG. 6A.
Figure 6B:
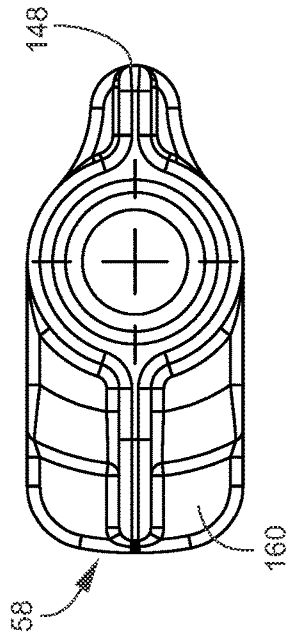
FIG. 6B is a top isolated view of the lift inhibitor of FIG. 6A.
Figure 6E:
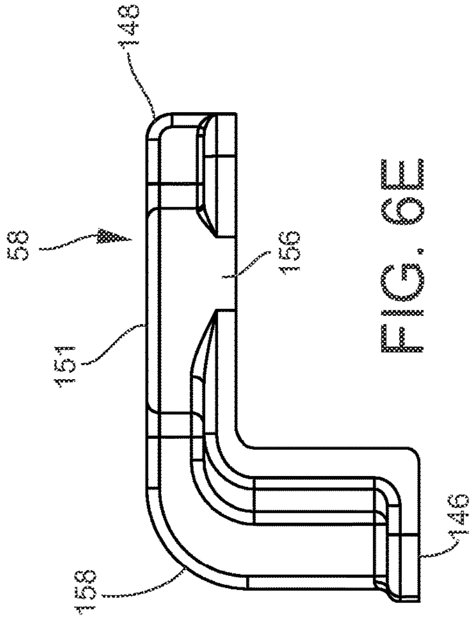
FIG. 6E is a section view of the lift inhibitor of FIG. 6A.
Figure 6D:
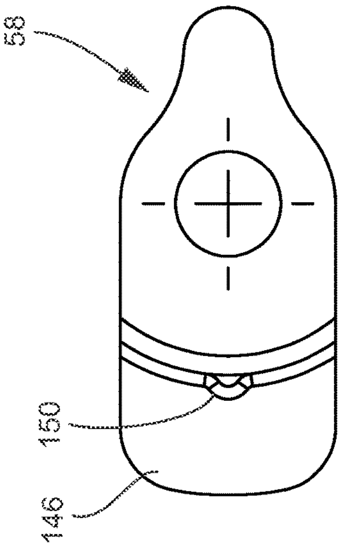
FIG. 6D is a bottom isolated view of the lift inhibitor of FIG. 6A.
Figure 6F:
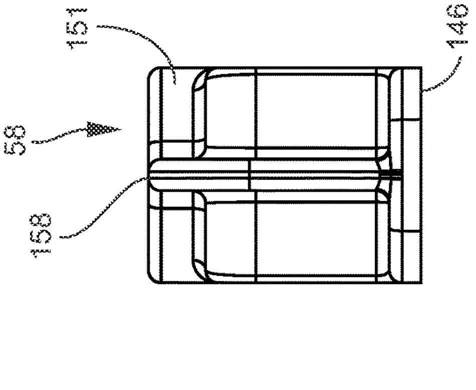
FIG. 6F is an end isolated view of the lift inhibitor of FIG. 6A.

Piece 34, junction 56 and pivoting stop 58 are shown in greater detail in FIG. 5. Piece 34 includes a lower and outer portion 36 that includes a distal apertured end 128 for the pin or axle of a hand wheel 130. The distal apertured end 128 includes an annular toothed portion 132 that engages with an annular toothed portion 134 of fencing 12. Toothed portions 132, 134 are squeezed together by a turning of the hand wheel 130 after a position of the fencing 12 is set. Distal apertured end 128 may be configured to engage to fencing different from fencing 12 or to engage to other vertical structures.

The transition from the lower and outer portion 36 to the upper and inner portion 38 occurs over the vertical support 30.

Upper and inner portion 38 extends inwardly to mount pivot post 40. A distal end 135 of the upper and inner portion 38 includes a curved or circular surface or face that extends from a front of the upper and inner portion 38 to a rear of the upper and inner portion 38. A raised inwardly and vertically extending nub 139 is disposed half-way from the front to the rear of the distal end 135 on such circular surface of the distal end 135 to engage an indent 150 in the pivoting stop 58 to hold the pivoting stop 58 against freely pivoting to the front or rear. Upper and inner portion 38 includes an underface or stop 136.

Junction 56 is a junction that avoids or works around a conventional right angle junction. In other words, if top horizontal support member 50 is extended hypothetically to equal the distance to which lowermost horizontal support member 32 is extended, and if tubular outer end support member 42 is extended hypothetically to equal the distance to which inner end support member 48 is extended, then such hypothetical extensions meet at a hypothetical junction directly under the underface or stop 136. The present inventors avoid this hypothetical junction. Such hypothetical junction does not permit the raising of gate 18 on post 40.

Junction 56 takes the scenic route or an oblique route from top horizontal support member 50 to outer end support member 42. Junction 56 permits the raising or lifting of gate 18 on post 40. Junction 56 is an oblique junction. Junction 56 includes a cut out 137 formed by first stop or horizontal face 138 and vertical face 140. The cut out 137 permits the raising of first gate 18 until the first stop 138 makes contact with the underface or stop 136 of piece 34. First stop 138 is formed on a portion of junction 56 adjacent to post 40. Post 40 extends through first stop 138. Post 40 extends through underface or stop 136.

Junction 56 includes a second stop 140. Second stop 140 is adjacent to top horizontal support member 50. Second stop 140 is parallel to the upper surface of top horizontal support member 50. Second stop 140 is located on junction 56 at a greater elevation than is first stop 138. Second stop 140 runs parallel to first stop 138. Second stop 140 is offset in the vertical direction from first stop 138. Second stop 140 is a stop for the pivoting stop 58.

Junction 56 includes a receptor 142 for engaging top horizontal support member 50. Top horizontal support member 50 extends outwardly beyond the outermost vertical support member 54, but does not extend to the post 40. Top horizontal support member 50 may be friction fit into the receptor 142.

Junction 56 includes a receptor 144 for the outer end vertical support member 42. Outer end vertical support member 42 may be friction fit into the receptor 144.

Junction 56 generally lies in a plane defined by the double door gate apparatus 10 when the first and second gates 18, 24 are closed.

As shown in FIG. 5, lift inhibitor or pivoting stop 58 is pivotably engaged to the distal end of upper and inner piece 38 of piece 34. Pivoting stop 58 includes an underface stop 146. Underface stop 146 is swingable forwardly and rearwardly of the first base frame 16. Underface stop 146 can swing into and through the vertical plane defined by the first base frame 16. Underface stop 146 can come to a rest in the vertical plane defined by the first base frame 16. A finger handle 148 is disposed 180 degrees opposite of the underface stop 146. Finger handle 148 can be gripped between the thumb and first finger to pivot the underface stop 146 to the desired location. When the underface stop 146 is disposed in the plane defined by the first base frame 16, the underface stop 146 prevents the first gate 18 from being raised or lifted by making contact with the second stop 140 when an attempt is made to raise or lift the first gate 18. Pivoting stop 58 includes a pivot pin 149 recessed in a boss 151. Pivot pin 149 engages pivoting stop 58 to the distal end 135 of the upper and inwardly extending portion 38.

Pivoting stop 58 is shown in greater detail in FIGS. 6A, 6B, 6C, 6D, 6E and 6F. Pivoting stop 58 includes a functional undersurface and a functional upper surface. The functional undersurface includes a curved or circular region 152 that rides on the curved or circular vertical face of distal end 135. Region 152 includes the indent 150 that receives the nub 139. Nub 139 snaps into and out of the indent 150 as the pivoting stop 58 is pivoted to an out-of-the-way position or an out-of-the-plane position to permit the first gate 18 to be lifted or raised. The stop face 146 is another portion of the functional undersurface of pivoting stop 58. The functional undersurface further includes a flat portion 154 that rotates on the upper surface of the upper and inwardly extending section 38.

Opposite of the flat portion 154 is boss 151 that receives pivot pin 149. Pivot pin 149 extends through opening 156 into the distal end 135 of piece 34. The head of the pivot pin 149 is relatively deeply received in boss 151. Boss 151 includes a circular upper edge and the head of pivot pin 149 is below such circular upper edge. Finger handle 148 is a ridge. A like ridge structure 158 extends on the opposite side of boss 151 to an upper face 160 that opposes stop face 146. Ridge structure 158 is L-shaped and resides in a common plane with finger handle 148. Ridge structure 158, like finger handle 148, may be gripped between the thumb and first finger to pivot the pivoting stop 58.

Figure 7:
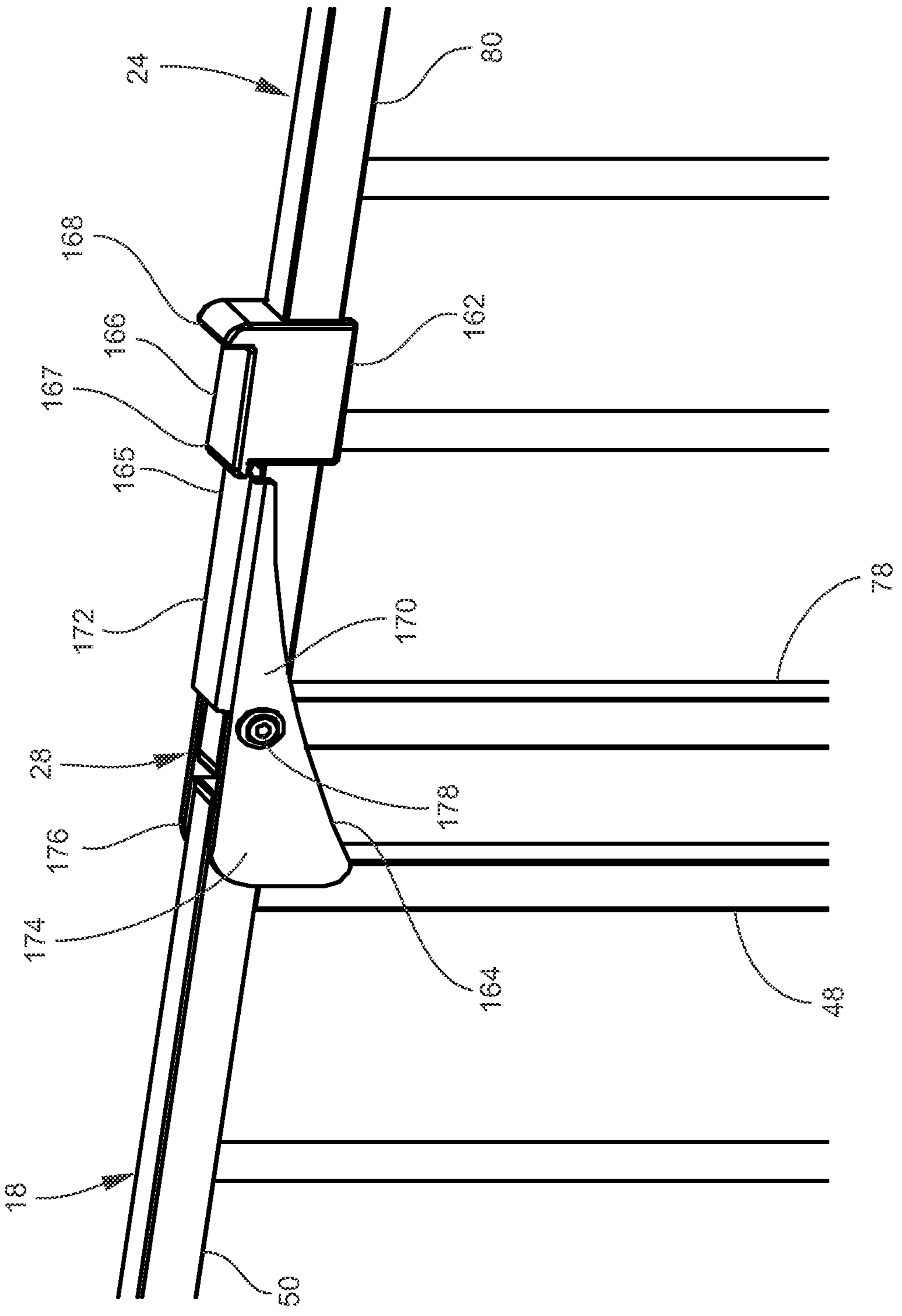
FIG. 7 is a perspective view of the latch apparatus of the double door gate apparatus of FIG. 2.
Figures 8A, 8B, 8C, 8D, 8E, 8F:
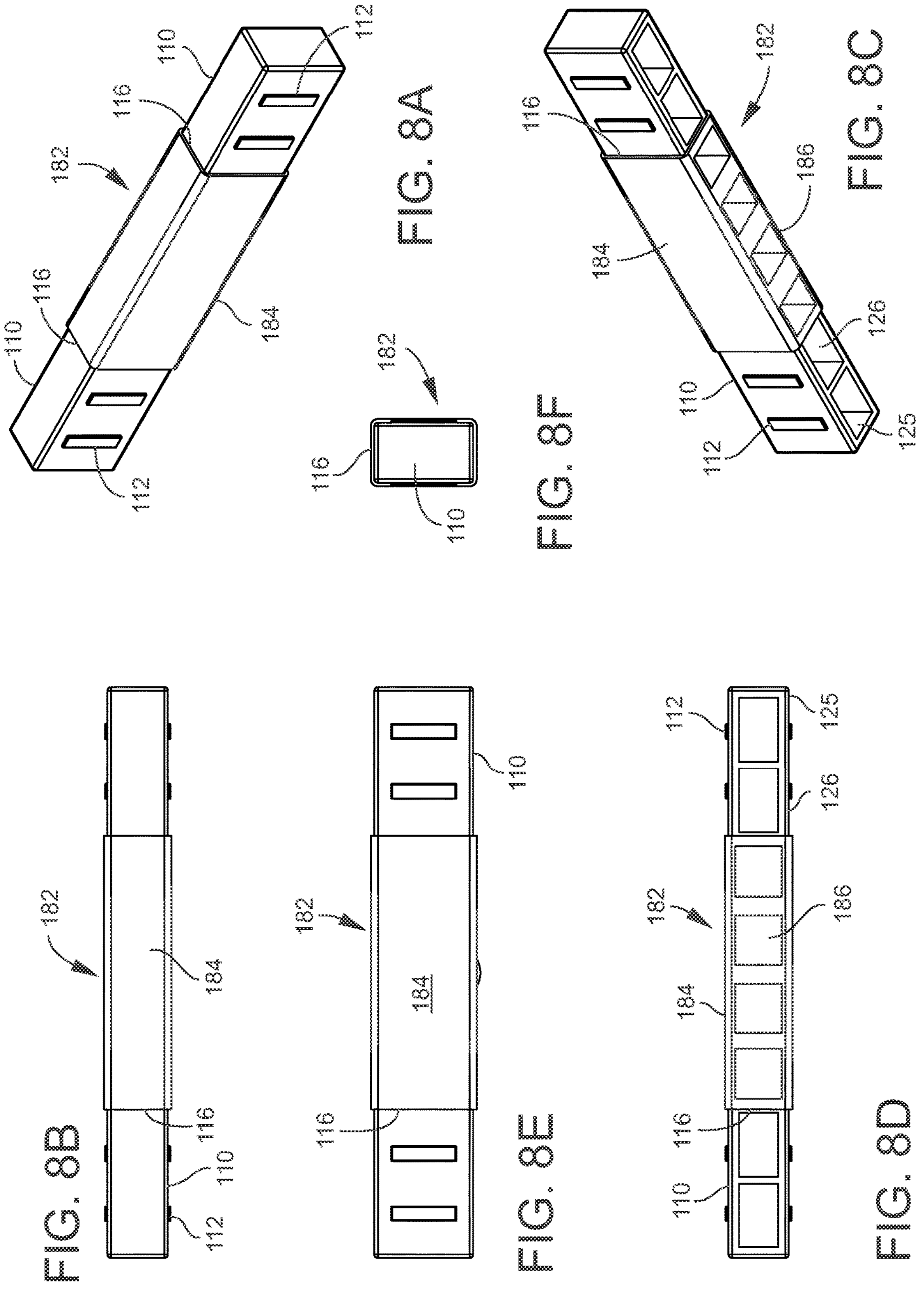
FIG. 8A is a top perspective isolated view of an alternate embodiment of the second connector of FIG. 4A.
FIG. 8B is a top isolated view of the second connector of FIG. 8A.
FIG. 8C is bottom perspective isolated view of the second connector of FIG. 8A.
FIG. 8D is a bottom perspective isolated view of the second connector of FIG. 8A.
FIG. 8E is a side isolated view of the second connector of FIG. 8A.
FIG. 8F is an end isolated view of the second connector of FIG. 8A.

FIG. 7 shows the latch apparatus 28. Latch apparatus 28 includes a keeper 162 and a latch arm 164. Latch arm 164 includes a catch end 165.

Keeper 162 includes a box like housing 166 that is engaged on and slides on the top horizontal support member 80. An extension 168 rises from a distal end of the housing 166 and rises above a flat top of the housing 166 such that a finger or hand can push against the extension 168 and, in doing so, slide the housing 166 away from the latch arm 164. A proximal end of the housing 166 includes a catch 167 having a frontwardly and downwardly extending surface and an undersurface. The catch end 165 of the latch arm 164 slides down the frontwardly and downwardly extending surface of the catch 167 and, in doing so, pushes the housing 166 rearwardly. Once the housing 166 is pushed sufficiently far, the catch end 165 of the latch arm 164 slides off the frontwardly and downwardly extending surface of the catch 167, whereupon the biased housing 166 under the pressure of a coil spring quickly returns forwardly, thereby catching the catch end 165 of the latch arm 164 on the undersurface of the catch 167 such that the catch end 165 of the latch arm 164 is retained from swinging upwardly until the housing 166 is again slid rearwardly. Housing 166 is normally biased in the forwardly sliding direction toward the latch arm 164 under the pressure of an internal coil spring in the housing 166.

Latch arm 164 includes catch end 165. Latch arm 164 further includes a pair of spaced apart side plate portions 170 engaged to each other by a top plate portion 172. Spaced apart ear sections 174 of the side plate portions 170 are found on a distal end of the latch arm 164. Latch arm 164 includes an open portion 176 defined by the spaced apart ear sections 174. Top plate portion 172 also defines the open portion 176 and the proximal end of the open portion 176. Bottom edges of ear sections 164 define an open bottom of the latch arm 164. Latch arm 164 is pivotally engaged to the distal end of top horizontal support arm 80 adjacent to the junction between top horizontal support arm 80 and inner end vertical support arm 78 of the second gate frame 26. A pivot pin 178 engages side plate portions 170 and the top horizontal support arm 80. Wound about and engaging the portion of the pivot pin 178 in tubular top horizontal support arm 80 is a torsion spring, where a free end of the torsion spring presses upwardly against the underside of top plate portion 172 to normally bias the latch arm 164 in an unengaged position where the latch arm 164 extends vertically and generally in line with inner end vertical support member 78. In an engaged position, the ear sections 174 are disposed on either side of first gate 18, specifically on either side of the inner or distal end of the top horizontal support member 50 of first gate frame 20 and on either side of the inner end vertical support member 48 of the first gate frame 20.

To open the latch apparatus 28, the keeper 162 is slid by hand toward the outer or proximal end of the top horizontal support member 80. This sliding releases the catch end 165 of the latch arm 164, which under pressure of its torsion spring pivots such that ear sections 174 swing downwardly and out of engagement with first gate 18 and such that catch end 165 swings upwardly until a stop, such as an inner protrusion on an inner face of one or more of the ear sections 174 hits the inner face of the inner end vertical support member 78. At this point, first gate 18 can swing, provided first gate 18 has been lifted such that U-shaped member 60 has cleared the lowermost horizontal support member 32. Subsequently, first gate 18 is swung back and lowered such that U-shaped member 60 again engages lowermost horizontal support member 32. Then the user may push down upon top plate 172 such that catch end 165 pivots downwardly and then slides down the frontwardly and downwardly engaging surface of the catch 167 so as to push the housing 166 toward the outer or proximal end of top horizontal support member 80 until catch end 165 crosses the tip of the catch 167, whereupon the housing 166 is pushed forwardly by its internal coil spring such that the undersurface of the catch 167 engages the catch end 165 to retain the ear sections 174 in a latched position on either side of the first gate 18.

Second connector 182 is an alternate to second connector 90. Whereas second connector 90 provides for a folding or pivoting of first and second base frames 16, 22, second connector 182 is a rigid connector that does not allow for pivoting of first and second base frames 16, 22 relative to each other. Second connector 182 supplements the first connector 88 or may be used to the exclusion of first connector 88. In other words, 1) connector 88 or connector 182 may be used alone, or 2) connectors 88 and 182 may be used at the same time. Connector 88 engages exterior portions of the lowermost horizontal support members 32, 64. Connector 182 engages interior portions of the lowermost horizontal support members 32, 64.

Connector 182 is integral and one-piece. Connector 182 is shown engaged to the double door gate apparatus 10 in FIG. 9 where connector 182 replaces connector 90 of FIG. 2. Reference number 10' indicates the double door gate apparatus having connector 182 and reference number 10 indicates the double door gate apparatus having connector 90.

Connector 182 includes the insertable male section 110 that that is rectangular in section and that is inserted into the open female end 46 of lowermost horizontal support member 32. On each of its front and rear faces, insertable male section 110 includes the pair of vertically extending spaced apart nubs 112 or raised sections 112 that offer a friction fit with the associated inside faces of the interior of the female open end 46 of the lowermost horizontal support member 32. Except for the raised sections 112, insertable male section 110 has a width that is substantially equal to the distance between the inside front and rear faces of open female end 46 and its lowermost horizontal support member 32 and a height that is substantially equal to the distance between the inside bottom and top surfaces of the open female end 46 and its lowermost horizontal support member 32. The top and bottom faces of insertable male section 110 are smooth and flat and planar and have no raised sections. Insertable male section 110 is hidden from view when in lowermost horizontal support member 32.

Connector 182 includes a visible stop section 184. Visible stop section 184 is rectangular in section and includes a width and height greater than the respective width and height of insertable male section 110. The width and height of visible stop section 114 is substantially the same as the width and height of the outer surfaces of the lowermost horizontal support member 32. When the insertable male section 110 of connector 182 is inserted into the open female end 46, the rectangular stop edge 116 stops the insertion of the second connector 182 into the lowermost horizontal support member 32 by abutting up against the inner end 46 of the lowermost horizontal support member 32. When connector 182 is engaged to the open female end 46 of lowermost horizontal frame support member 32, visible stop section 184 of first portion 104 is visible.

Connector 182 includes a second insertable male section 110 that that is rectangular in section and that is inserted into the open female end 76 of lowermost horizontal support member 64. On each of its front and rear faces, this second insertable male section 110 includes a pair of vertically extending spaced apart nubs 112 or raised sections 112 that offer a friction fit with the associated inside faces of the interior of the female open end 76 of the lowermost horizontal support member 64. Except for the raised sections 112, this second insertable male section 110 has a width that is substantially equal to the distance between the inside front and rear faces of open female end 76 and its lowermost horizontal support member 64 and a height that is substantially equal to the distance between the inside bottom and top surfaces of the open female end 76 and its lowermost horizontal support member 64. The top and bottom faces of this second insertable male section 110 are smooth and flat and planar and have no raised sections. This second insertable male section 110 is hidden from view when in lowermost horizontal support member 64.

Second connector 182 includes first and second insertable male sections 110 on, respectively, first and second ends. First and second insertable male sections 110 are one-piece and integral with visible stop section 184.

Visible stop section 184 is rectangular in section and includes a width and height greater than the respective width and height of the second insertable male section 110. The width and height of visible stop section 184 is substantially the same as the width and height of the outside faces of the lowermost horizontal support member 64. When the second insertable male section 110 of second connector 182 is inserted into the open female end 76, the second rectangular stop edge 116 stops the insertion of the second connector 182 into the lowermost horizontal support member 64 by abutting up against the inner end 76 of the lowermost horizontal support member 64. When the second connector 182 is engaged to the open female end 76 of lowermost horizontal frame support member 64, visible stop section 184 of the second connector 182 is visible.

Each of the first and second insertable male sections 110 of the second connector 182 are made up of two boxes 125, 126 that share an inner wall or an end side. Each of the boxes 125, 126 includes five sides and an open bottom, where the five sides include a front side, a back side, a top side and two end sides and where the top side is opposite of the open bottom.

The visible stop section 184 is made up of four box like structures 186 having five sides and an open bottom, where the five sides include a front side, a back side, a top side and two end sides and where the top side is opposite of the open bottom. Visible section 185 shares an end wall with box 126 of each of the first and second insertable male sections 110, with such end wall of the visible section 184 having a greater width and height than the end wall of box 126.

Prior to operation, an unassembled double door gate apparatus 10 or 10' may be shipped. In an unassembled form, each of the following parts may not be connected to any of the other following parts: 1) the first base frame 16, 2) the second base frame 22, 3) the first gate 18, 4) the second gate 24, 5) the first connector 88, 6) the second connector 90, and 7) the second connector 182. The end user may have the choice of using either of the second connectors 90, 182. At this point, it should be noted that the length of the first gate 16 is generally the same as the length of the lowermost horizontal support member 32, which defines the length of the first base frame 16. Likewise, the length of the second gate 24 is generally the same as the length of the lowermost horizontal support member 64, which defines the length of the second base frame 22. Accordingly, applicant takes advantage of the length of the longest piece to include other pieces of the same length because the shipping carton necessarily is about the length of the longest piece. Since applicant takes advantage of such, a double door gate apparatus 10 or 10' of a greater overall length may be formed by the end user without any increase in the length of the shipping carton. That applicant takes advantage of such can be seen in FIG. 2, where it is shown that the inner end of the first gate 18 extends beyond the inner end of the lowermost horizontal support member 32 and where it is shown that the inner end of the second gate 24 extends beyond the inner end of the lowermost horizontal support member 64. When assembled, first gate 18 is offset from its first base frame 16. When assemble, second gate 24 is offset from its second base frame 22. Applicant then covers the distance between the inner ends 46 and 76 of the respective lowermost horizontal support members 32, 64 by engaging the first and second connectors 88 and 90 on the one hand or engaging the first and second connectors 88 and 182 on the other hand. If desired, first and second connectors 88, 182 may be one-piece with each other or engaged to each other either before or after assembly.

Figure 9:
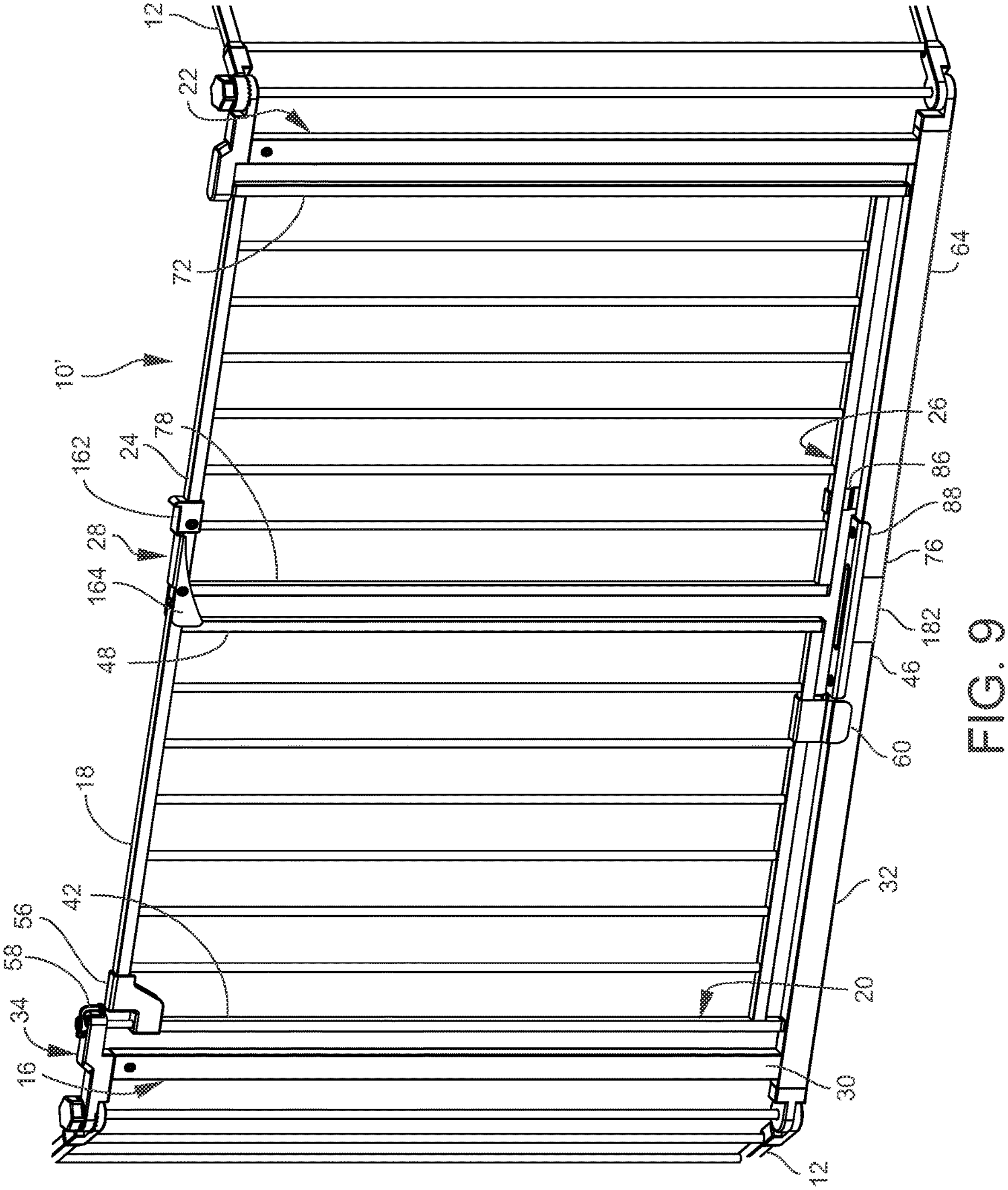
FIG. 9 is a perspective view of the double door gate apparatus with the alternate second connector of FIG. 8A.

In operation, after assembly of the double door gate apparatus 10 or 10' and after engaging one or more of the connectors 88, 90, 182, the double door gate apparatus 10 or 10' takes the form shown in FIG. 2 or FIG. 9. If only connector 90 is engaged the double door apparatus 10 may be folded for storage such that first and second gates 18, 24 confront each other face to face. If at least one of the connectors 88, 182 is engaged, the first and second base frames 16, 22 are rigid and one-piece. If connectors 88 and 90 are engaged, the first and second base frames 16, 22 are rigid and one-piece. If connectors 88 and 182 are engaged, the first and second base frames 16, 22 are rigid and one-piece. Each of the connectors 88, 90 and 182 is removable from the lowermost horizontal support members 32, 64 after being engaged thereto. Connector 88 engages exterior portions of the lowermost horizontal support members 32, 64. Connectors 90 and 182 engage interior portions of the lowermost horizontal support members 32, 64.

To open the second gate 24 of the double door gate apparatus 10 or 10' from the closed configuration shown in FIG. 2 or FIG. 9, the keeper 162 is slid away from the latch arm 164 to release the spring loaded latch arm 164, which pivots to a vertical position so as to no longer engage the first and second gates 18, 24 to each other. Then second gate 24 may be swung open in the direction permitted by stop 86. To close the second gate 24, the second gate 24 is swung back to be co-planar with the second base frame 22. Then catch end 165 is lowered to snappingly engage the catch 167 of the keeper 162.

To open the first gate 18 of the double door gate apparatus 10 or 10' from the closed configuration shown in FIG. 2 or FIG. 9, the pivoting stop 58 is pivoted to an out-of-the-way position. Then the first gate 18 is lifted such that the bottom edges of the U-shaped stop 60 attain a higher elevation than the upper surface of lowermost horizontal support member 32. This lifting raises the inner end of first gate 18 between the ear sections 174 of the latch arm 164. Then the keeper 162 is slid away from the latch arm 164 to release the spring loaded latch arm 164, which pivots to a vertical position so as to no longer engage the first gate 18. Then the first gate 18 may be swung in either direction away from the lowermost horizontal support member 32. To close the first gate 18, the first gate 18 is raised so that the bottom edges of U-shaped stop 60 clear the upper surface of the lowermost horizontal support member 32. Then the first gate 18 is swung to be co-planar with the first base frame 16. Then the first gate 18 is lowered such that the U-shaped stop 60 is disposed on each of the sides of the lowermost horizontal support member 32. Then the catch end 165 is lowered to engage the catch 167 of the keeper 162 such that ear sections 174 engage the inner end of first gate 18. Then the pivoting stop 58 is pivoted to engage the upper surface of junction 56.

If desired, both of gates 18 and 24 may be open at the same time.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A double door gate apparatus comprising:

a) a first base frame, the first base frame including a first outer end frame member that extends vertically and a first lowermost frame member that extends horizontally, the first lowermost frame member having a first inner end, the first inner end having a top face, front face, and rear face;

b) a first gate pivotally engaged to the first base frame;

c) a second base frame, the second base frame including a second outer end frame member that extends vertically and a second lowermost frame member that extends horizontally, the second lowermost frame member having a second inner end, the second inner end having a top face, front face and rear face;

d) a second gate pivotally engaged to the second base frame;

e) the first gate having an uppermost frame member;

f) the second gate having an uppermost frame member;

g) a latch apparatus engaging the uppermost frame member of the first gate and further engaging the uppermost frame member of the second gate;

h) a connector engaging the first inner end of the first lowermost frame member to the second inner end of the second lowermost frame member, the connector being disengagable from each of the first inner end of the first lowermost frame member and the second inner end of the second lowermost frame member without destroying an integrity of any of the first and second lowermost frame members; and i) a space between the first and second gates defining a vertical axis, the vertical axis extending through the connector;

j) a first portion of the connector being adjacent to a portion of the first gate when the first gate is closed;

k) a second portion of the connector being adjacent to a portion of the second gate when the second gate is closed.

2. The double door gate apparatus of claim 1, wherein the first gate has a first width, wherein the second gate has a second width, and wherein the first and second widths are the same.

3. The double door gate apparatus of claim 2, wherein the first gate includes no more and no less than a given number of upright support members and wherein the second gate includes no more and no less than said given number of upright support members.

4. The double door gate apparatus of claim 1, wherein one gate is liftable and one gate is non-liftable at all times, wherein the gate that is liftable includes a top surface spaced from a first portion of one of the base frames such that said top surface is liftable up to be adjacent to said first portion.

5. The double door gate apparatus of claim 1, wherein one gate is liftable and one gate is non-liftable at all times, wherein the gate that is non-liftable includes a top surface that abuts at all times a second portion of one of the base frames such that said gate is not liftable at all times.

* * * * *